United States Patent
Shen et al.

(10) Patent No.: US 8,860,881 B2
(45) Date of Patent: Oct. 14, 2014

(54) CABLE FOR TWO-WAY DIGITAL SIGNALING AND ELECTRICAL SIGNAGE SYSTEM EMPLOYING THE SAME

(75) Inventors: Fu-Chin Shen, Shijr (TW); Kuo-Feng Kao, Shijr (TW)

(73) Assignee: Aten International Co., Ltd., Shijr (TW)

( * ) Notice: Subject to any disclaimer, the term of this patent is extended or adjusted under 35 U.S.C. 154(b) by 193 days.

(21) Appl. No.: 13/289,900

(22) Filed: Nov. 4, 2011

(65) Prior Publication Data

US 2012/0327299 A1 Dec. 27, 2012

(51) Int. Cl.
*H04N 5/04* (2006.01)
*H04N 7/10* (2006.01)
*H04L 25/02* (2006.01)

(52) U.S. Cl.
CPC ............ *H04N 7/108* (2013.01); *H04L 25/0272* (2013.01)
USPC ........ 348/500; 348/723; 348/488; 348/14.09; 725/105

(58) Field of Classification Search
USPC ............. 348/14.08, 445; 345/650; 705/14.16; 709/230
See application file for complete search history.

(56) References Cited

U.S. PATENT DOCUMENTS

| | | | |
|---|---|---|---|
| 5,777,664 A * | 7/1998 | Sakata et al. ............... | 348/14.12 |
| 2004/0015597 A1 | 1/2004 | Thornton | |
| 2004/0103570 A1 | 6/2004 | Ruttenberg | |
| 2005/0132078 A1 * | 6/2005 | Kumar et al. ................. | 709/230 |
| 2009/0051756 A1 * | 2/2009 | Trachtenberg et al. .... | 348/14.08 |
| 2010/0283324 A1 | 11/2010 | Lee et al. | |

FOREIGN PATENT DOCUMENTS

| TW | 486639 B | 5/2002 |
|---|---|---|
| TW | M299898 U | 10/2006 |
| TW | 200929919 A | 7/2009 |
| TW | 201025852 A | 7/2010 |

OTHER PUBLICATIONS

Taiwanese Office Action, dated Jun. 23, 2014, in a counterpart Taiwanese patent application, No. TW 100121648.

* cited by examiner

*Primary Examiner* — Jefferey Harold
*Assistant Examiner* — Sihar Karwan
(74) *Attorney, Agent, or Firm* — Chen Yoshimura LLP

(57) ABSTRACT

A digital signage system includes at least one set of differential transmission lines, a transmitter, at least one receiver, and at least one digital signage device. Each set of differential transmission lines includes four pairs of differential transmitting lines. The transmitter converts image and/or audio signal into first to third pairs of differential signals for output to the first to third pairs of differential transmission lines, and receives remote-captured video and/or audio signal via the fourth pair of differential transmission lines. The receiver receives the first to third pairs of differential signal from the first to third pairs of differential transmission lines, and extracts the video and/or audio signal to be displayed on the digital signage device. The receiver receives and processes a remote-captured video and/or audio signal from a remote capture device, and transmits such signal back to the transmitter via the fourth pair of differential transmission lines.

24 Claims, 7 Drawing Sheets

CABLE FOR TWO-WAY DIGITAL SIGNALING AND ELECTRICAL SIGNAGE SYSTEM EMPLOYING THE SAME

BACKGROUND OF THE INVENTION

1. Field of the Invention

This invention relates to an electrical digital signage system, and in particular, it relates to an electrical digital signage system which employs a Category 5 (Cat. 5) differential cable to achieve bi-directional transmission of video data signals.

2. Description of the Related Art

Electrical digital signage or billboards can conveniently and timely dispatch information. In recent years, with the advance of relevant technologies, digital signage has gained widespread use, and can now be seen at places such as airport waiting areas, box offices at cinemas, stores, malls, public transportation areas, etc. Digital signage devices are often located at places where consumers may stop temporarily, and use audiovisual effects to attract their attention. Thus, digital signage has a large commercial potential. The timeliness of the content, the ability to interact with consumers, and the stability of the system are important properties of advertising system for advertisers and manufacturers. Due to these properties and the audiovisual abilities, digital signage has many advantages in these respects over traditional signage systems. For example, during holiday seasons, promotional information can be timely transmitted to various places of commercial activity via networks, and the signage devices at these places of commercial activities can immediately update the information displayed on the signage. Such mode of advertising will likely gain wider use in the future. In addition, digital signage is environmentally friendly as it replaces conventional signage made of paper of other materials.

A system that provides for central management of multiple digital signage devices will further allow convenient content management. In particular, digital signage devices that are coupled to networks via wireless communication allow contents to be easily updated without physically replacing the signage. Such intelligent digital signage system will be used more widely in the future.

While current digital signage systems can already achieve many advantageous functions, many current digital signage systems are set up to be uni-directional (i.e., data can be transmitted from a management device to the signage devices for display, but data transmission only goes in one direction) and non-IP enabled. Many systems are set up in different ways depending on whether they are centrally managed or separately managed. After a digital signage system is set up, if it is desired to be upgraded to a bi-directional data transmission system, the entire network system may need to be re-built or additional transmission lines may need to be added. This is inconvenient and costly.

SUMMARY OF THE INVENTION

Accordingly, the present invention is directed to a digital signage system that substantially obviates one or more of the problems due to limitations and disadvantages of the related art.

An object of the present invention is to provide an electrical digital signage system which employs a Cat. 5 differential cable to achieve bi-directional transmission of video data signals.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a digital signage system, which includes: a transmitting device adapted for coupling to one end of at least one set of differential transmission lines, each set including a first, a second, a third and a fourth pair of differential transmission lines, the transmitting device receiving at least one video and/or audio signal, transforming the at least one video and/or audio signal to a first, a second, and a third pair of differential signals, and transmitting the first, second, and third pair of differential signals to the first, second, and third pair of differential transmission lines; and at least one receiving device each adapted for coupling to another end of one of the at least one set of differential transmission lines, for receiving the first, second, and third pair of differential signals from the first, second, and third pair of differential transmission lines, and transforming the first, second, and third pair of differential signals to the at least one video and/or audio signal, wherein each receiving device receives a remote-captured video and/or audio signal and a remote data signal, generating a processed remote-captured video and/or audio signal which contains a remote video signal, a remote audio signal and the remote data signal, and transmitting the processed remote-captured video and/or audio signal to the transmitting device via the fourth pair of differential transmission lines.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems, operating structures and methods in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Embodiments of the present invention provide a digital signage system which requires only one Cat. 5 (Category 5) differential cable to achieve bi-directional audio and video data transmission. It reduces complexity of the digital signage system, reduces cost and saves construction time.

Figure 1:
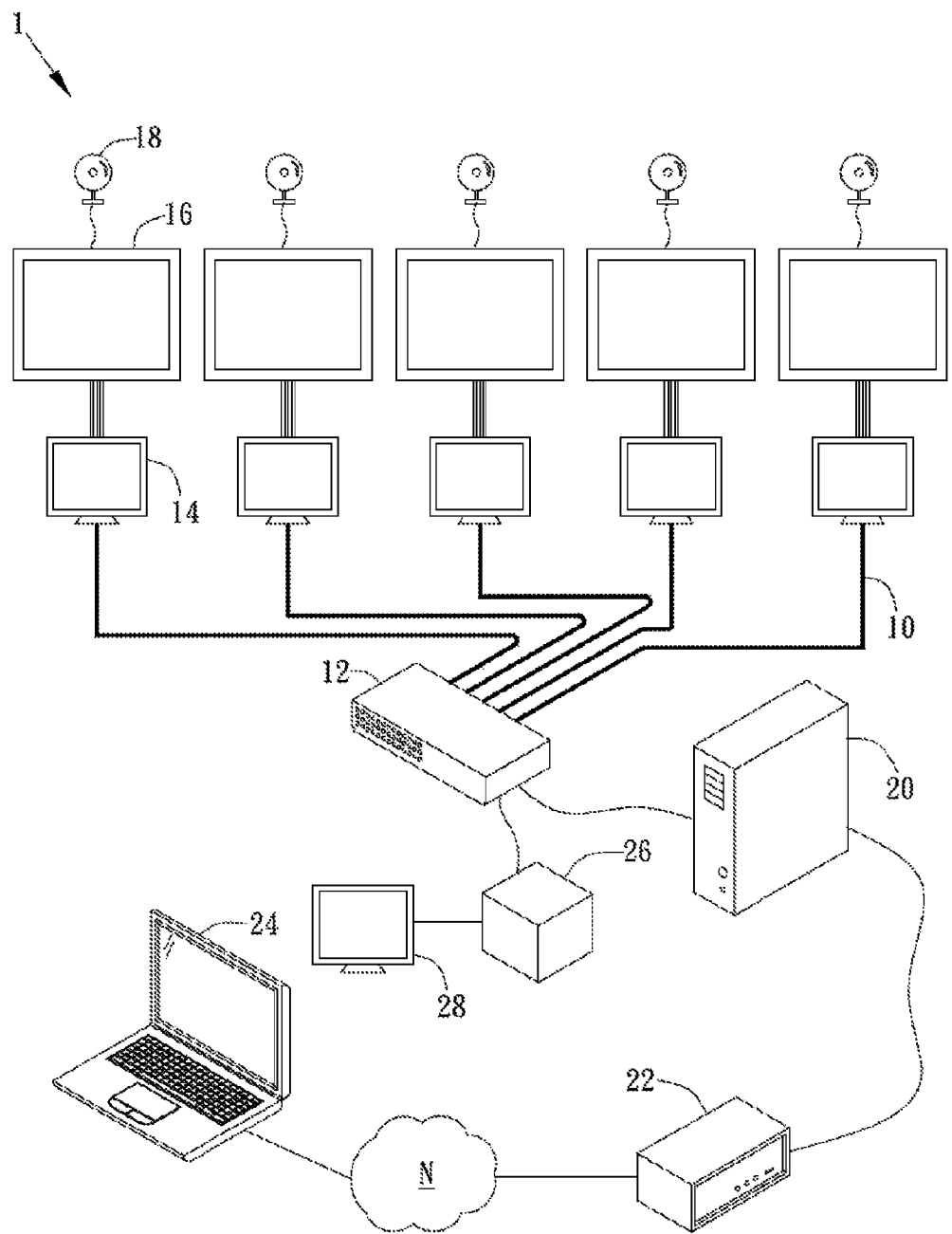
FIG. 1 illustrates a digital signage system according to an embodiment of the present invention.

FIG. 1 illustrates a digital signage system according to embodiments of the present invention. The digital signage system 1 includes at least one set of differential transmission lines 10, a transmitting device 12, at least one receiving device 14, at least one digital signage device 16, at least one video and audio capture device 18, a video and/or audio signal generating device 20, a control device 22, a network N, a remote control station 24, a local station receiver 26, and local control station 28. The numbers of the at least one set of differential transmission lines 10, at least one receiving device 14, at least one digital signage device 16, and at least one video and audio capture device 18 are equal to each other, and the number can be one or more depending on the practical need. Five are shown in FIG. 1 as an example but the invention is not limiter thereto. The descriptions below focus on one set of these components unless otherwise noted.

As shown in FIG. 1, in the digital signage system 1, each set of differential transmission lines 10 is coupled between the transmitting device 12 and a corresponding receiving device 14; each receiving device 14 is coupled to a corresponding digital signage device 16 and a corresponding video and audio capture device 18. The video and audio capture device 18 can be installed in the vicinity of the corresponding digital signage device 16 or built into the digital signage device 16, and can be used to capture images and sound of viewers located in front or in the vicinity of the digital signage device. The video and/or audio signal generating device 20 is coupled between the transmitting device 12 and the control device 22. The local station receiver 26 is coupled between the transmitting device 12 and the local control station 28. The remote control station 24 is coupled to the control device 22 via the network N.

Each set of differential transmission lines 10 may be a Cat. 5 cable or another suitable cable having four pairs (or more) of differential transmission lines. The digital signage device 16 may be a liquid crystal display (LCD) device or other suitable display device. The video and audio capture device 18 may be a digital video camera, digital still camera or other suitable capture devices. The network N may be any suitable network.

In this embodiment, the control device 22 receives a first control signal from the remote control station 24 via the network N, and outputs the first control signal to the video and/or audio signal generating device 20. Based on the first control signal, the video and/or audio signal generating device 20 generates at least one video and/or audio signal and outputs it to the transmitting device 12. In addition, the local station receiver 26 may receive a second control signal from the local control station 28, and generates at least one video and/or audio signal based on the second control signal and outputs it to the transmitting device 12. The transmitting device 12 transmits at least one video and/or audio signal to the receiving device 14 via three pairs of differential lines among the set of lines 10. The receiving device 14 extracts the video and/or audio signal, and the digital signage device 16 displays the video and/or audio signal.

The remote-captured video and/or audio signals, i.e. video and/or audio signals from the remote end (the signage device) that have been captured by the video and audio capture device 18, and remote data signals which are generated by the digital signage device 16 or the capture device 18, are transmitted by the receiving device 14 to the transmitting device 12 via the remaining one pair of differential lines among the set of lines 10. The remote-captured video and/or audio signals contain, for example, video images and voices of viewers in front of the digital signage device. The transmitting device 12 may, depending on the practical needs, transmit the remote-captured video and/or audio signals to the remote control station 24 via the control device 22 and the network N, or transmit it to the local control station 28 via the local station receiver 26. The remote control station 24 or the local control station 28 processes the captured data for statistical or other purposes.

Figure 2:
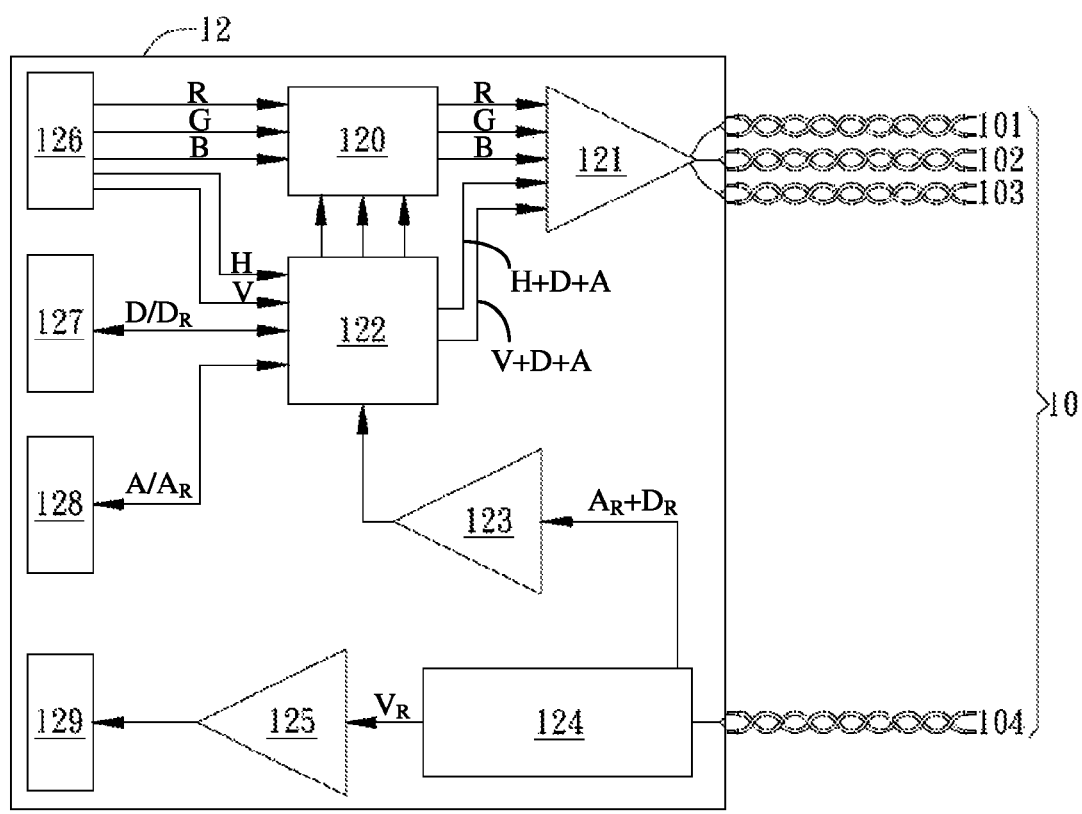
FIG. 2 illustrates an example of a transmitting device of the digital signage system.
Figure 3:
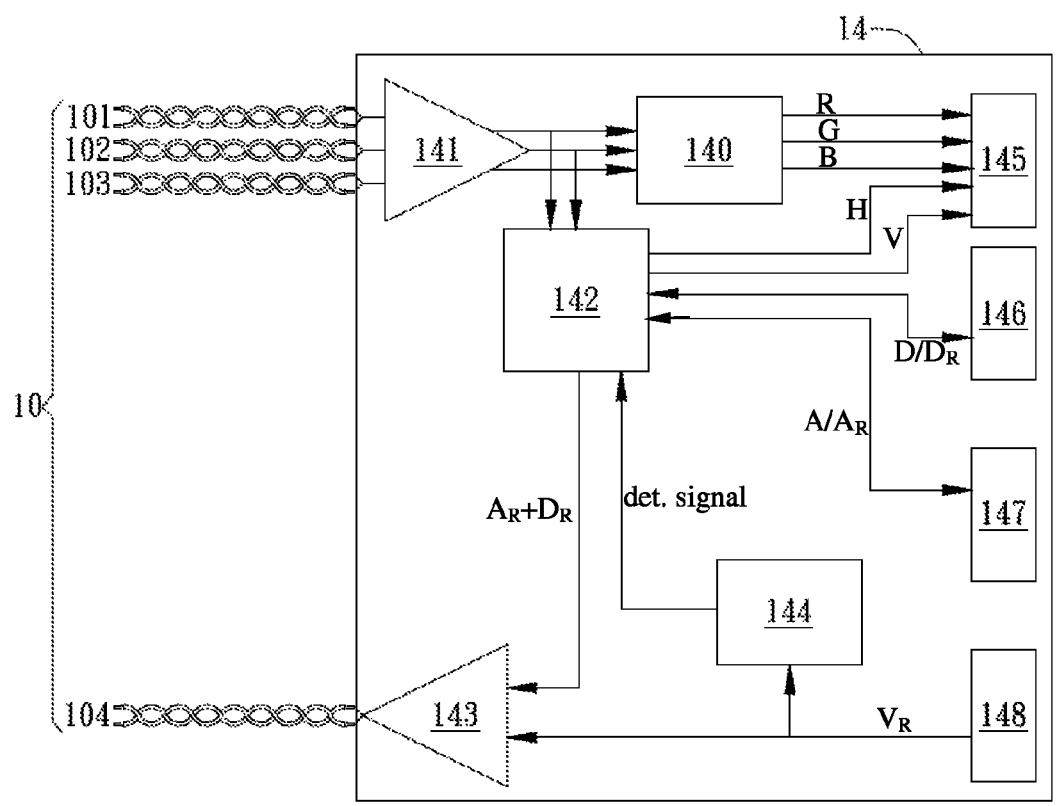
FIG. 3 illustrates an example of a receiving device of the digital signage system.

Referring to FIGS. 2 and 3, the structures of the transmitting device 12 and the receiving device 14, respectively, are illustrated in more detail. The embodiment shown in FIGS. 2 and 3 are suitable when the remote-captured video and/or audio signals use a composite interface format signals. As shown in FIGS. 2 and 3, the set of differential transmission lines 10 that couple the transmitting device 12 and the receiving device 14 includes a first, a second, a third and a fourth pair of differential transmission lines 101, 102, 103, and 104, respectively.

The structure of the transmitting device 12 is described first. In this embodiment, the transmitting device 12 receives at least one video signal and/or audio signal, transforms the at least one video and/or audio signal into a first pair of video differential signals (e.g. R+/R−), a second pair of video differential signals (e.g. G+/G−), and a third pair of video differential signals (e.g. B+/B−), and outputs the first, second and third pairs of differential signals to the first, second and third pairs of differential transmission lines 101, 102 and 103, respectively.

As shown in FIG. 2, the transmitting device 12 includes a first processing module 120, a second processing module 122, a third processing module 124, a first amplifier 123, a second amplifier 125, a third amplifying and signal composing circuit 121, a video input port 126, a data input/output port 127, an audio input/output port 128, and a video output port 129. The video input port 126 is coupled to the first processing module 120 and the second processing module 122; the data input/output port 127 is coupled to the second processing module 122; the audio input/output port 128 is coupled to the second processing module 122; and the video output port 129 is coupled to the second amplifier 125. The third amplifying and signal composing circuit 121 is coupled between the first processing module 120 and the second processing module 122 on the one side and the first, second and third pairs of differential transmission lines 101, 102 and 103 on the other. The first amplifier 123 is coupled between the second processing module 122 and the third processing module 124. The third processing module 124 (which may be an analog switch) is coupled between the second amplifier 125 and the fourth pair of differential lines 104.

In this embodiment, the at least one video and/or audio signal includes video signal RGB, a pair of horizontal sync differential signals H+/H−, a pair of vertical sync differential signals V+/V−, an audio signal A and a data signal D, but are not limited thereto. The RGB video signals, the pair of horizontal sync differential signals H+/H− and the pair of vertical sync differential signals V+/V− are inputted from the video input port 126; the data signals D are transmitted bi-directionally via the data input/output port 127; and the audio signals A are transmitted bi-directionally via the audio input/output port 128. More specifically, the video input port 126 transmits the first, second and third pairs of video differential signals R+/R−, G+/G− and B+/B− of the RGB video signals to the first processing module 120, and transmits the pair of horizontal sync differential signals H+/H− and the pair of vertical sync differential signals V+/V− to the second processing module 122.

In FIG. 2 (as well as FIGS. 3-5), the signal lines are labeled with symbols that indicate the signal being carried on the lines. In these figures, the symbols represent differential signals, e.g., the symbol R represents R+/R− signals. Further, the "+" symbols indicate composite signals, as will be described later. In addition, $V_R$, $A_R$, and $D_R$ represent remote-captured video signals, remote-captured audio signals and remote-captured data signals, respectively, as will be described later.

In various implementations, the video input port 126 may use a VGA format or other format video input port; the data input/output port 127 may use an asynchronous transmission standard interface RS-232 or other format data input/output port; and the audio input/output port 128 may use any suitable format audio input/output port.

When the first processing module 120 receives the first, second and third pairs of video differential signals R+/R−, G+/G− and B+/B− of the RGB video signals, it switches the RGB signal to one of the multiple third amplifying and signal composing circuits 121 for transmission to one of the receiving devices 14 via the corresponding set of lines 10. The first processing module 120 may be an analog switch but is not limited thereto. It should be noted that although only one third amplifying and signal composing circuit 121 is shown in FIG. 2, the transmitting device 12 may have multiple third amplifying and signal composing circuits 121 corresponding to multiple sets of lines 10 and multiple receiving devices 14 (see FIG. 1).

In this embodiment, the second processing module 122 transforms the audio signals A and data signals D into a pair of differential audio signals A+/A− and a pair of differential data signals D+/D−, respectively. In various implementations, the second processing module 122 may be a data/sync receiver, but is not limited thereto. The second processing module 122 also has a switching function to switch to one of the multiple third amplifying and signal composing circuit 121. The first processing module 120, the second processing module 122 and the third amplifying and signal composing circuit 121 collectively perform the function of composing the pair of horizontal sync differential signals H+/H− and the pair of vertical sync differential signals V+/V− with any two of the first, second and third pairs of video differential signals R+/R−, G+/G− and B+/B−, to generate two pairs of composite differential signals, such as a first pair of composite differential signals H+R+/H-R− and the second pair of composite differential signals V+G+/V-G−, and loading the differential audio signals A+/A− and differential data signals D+/D− onto two of the three pairs of video differential signals H+R+/H-R−, V+G+/V-G− and B+/B−, to generate three composite differential signals that collectively contains video, sync, audio and data signals.

In the example shown in FIG. 2, the second processing module 122 first loads the differential audio signals A+/A− and differential data signals D+/D− onto the pair of horizontal sync differential signals H+/H− and the pair of vertical sync differential signals V+/V− and output the loaded signals to the third amplifying and signal composing circuit 121. The third amplifying and signal composing circuit 121 then composes the loaded signals from the second processing module 122 with any two of the three pairs of video differential signals R+/R−, G+/G— and B+/B− from the first processing module 120, to generate the three composite differential signals, and amplifies them and outputs them to the first, second, and third pairs of differential transmission lines 101, 102, and 103. Note that in this example, no signal is outputted from the second processing module 122 to the first processing module 120. In an alternative example (not shown in FIG. 2), a different sequence of composing data is used: the second processing module 122 outputs the horizontal and vertical sync signals to the first processing module 120, which composes it with two of the three pairs of video signals and outputs the composite video signals to the third amplifying and signal composing circuit 121. The second processing module 122 also outputs the differential audio and data signals to the third amplifying and signal composing circuit 121, and the third amplifying and signal composing circuit 121 loads the audio and data signals received from the second processing module 122 into the composite video signals received from the first processing module 120, and amplifies the resulting signals and outputs them to the lines 101, 102 and 103. It should be noted that a particular sequence of composing/loading the signals is not required. While the first processing module 120, the second processing module 122 and the third amplifying and signal composing circuit 121 collectively generate the three composite differential signals to be outputted to the lines 101, 102 and 103, the function of each circuit is not limited to a particular example.

Figure 6:
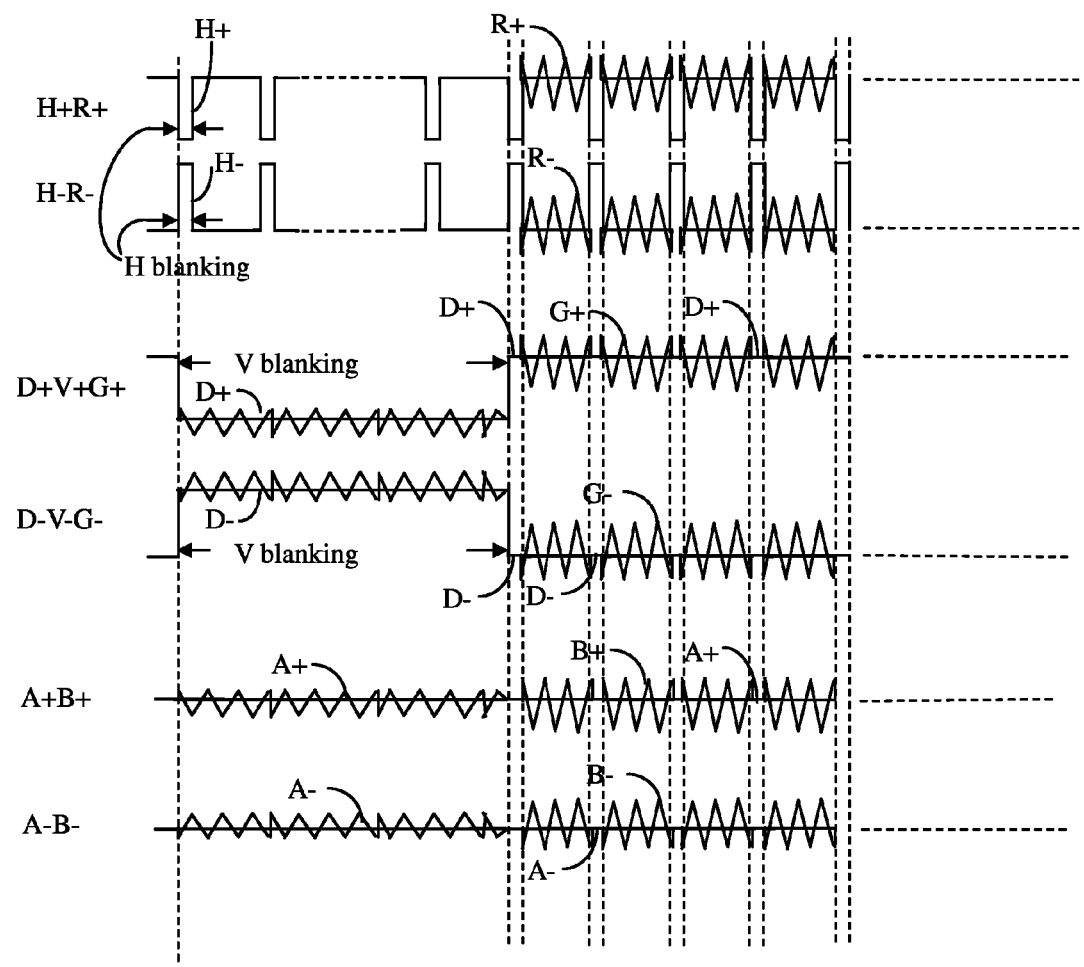
FIG. 6 schematically illustrate first, second and third pairs of differential signals containing differential video, audio and data signals.

The differential audio signals A+/A− and differential data signals D+/D− are loaded onto the differential signals H+R+/H-R−, V+G+/V-G− and B+/B− such that the differential audio signals A+/A− and the differential data signals D+/D− are present only during the blanking periods of the video signal. Blanking periods refer to periods during which the vertical and/or horizontal sync signals of the video signal are active. During blanking periods, the RGB data is not present or is meaningless. In the exemplary waveforms shown in FIG. 6, the differential data signals D+/D− are loaded into the second pair of video differential signals V+G+/V-G−, and the differential audio signals A+/A− are loaded into the third pair of video differential signals B+/B−, during the V blanking and H blanking periods of the respective differential signals. Because there is no meaningful RGB data during the blanking periods, these periods may be used to transmit the data and audio signals without affecting the video data transmission.

The third processing module 124 receives differential signals (processed remote-captured video and/or audio signals) from the fourth pair of differential transmission lines 104, and separates the various types of signals contained therein, including remote video signals, remote audio signals and remote data signals. As will be described later, the remote audio signals and remote data signals have been loaded into the blanking periods of the remote video signals by the receiving device 14. The third processing module 124 transmits the remote audio and remote data signals to the first amplifier 123 for amplification and then to the second processing module 122. The third processing module 124 transmits the remote video signals to the second amplifier 125 for amplification and then outputted via the video output port 129. The third processing module 124 has a switching function to switch among the lines 104 from multiple receiving devices 14. The video output port 129 may use an RCA format connector, but they are not limited thereto.

The structure of the receiving device 14 is described next with reference to FIG. 3. In this embodiment, the receiving device 14 receives first, second and third pairs of differential signals from first, second, and third pairs of differential transmission lines 101, 102, and 103 of the set of lines 10, respectively, and extracts the at least one video and/or audio signal contained therein. In addition, the receiving device 14 receives and processes remote-captured video and/or audio signals captured by the remote capture device 18, and transmits the processed remote-captured video and/or audio signals via the fourth pair of differential transmission lines 104 to the transmitting device 12. In this embodiment, the remote-captured video and/or audio signals captured by the remote capture device 18 may be composite interface format video and/or audio signals, but are not limited thereto.

As shown in FIG. 3, the receiving device 14 includes a first processing module 140, a first amplifier 141, a second processing module 142, a second amplifier 143, a sync detection module 144, a video output port 145, a data input/output port 146, an audio input/output port 147, and a video input port 148. The first amplifier 141 is coupled to the first, second, and third pairs of differential transmission lines 101, 102, and 103 on the one side and to the first processing module 140 on the other. The second processing module 142 is coupled to a point between the first processing module 140 and the first amplifier 141 and coupled to the second amplifier 143. The second amplifier 143 is coupled between the fourth pair of differential transmission lines 104 and the video input port 148. The sync detection module 144 is coupled to a point between the second amplifier 143 and the video input port 148, and coupled to the second processing module 142. The video output port 145 is coupled to the first processing module 140 and the second processing module 142; the data input/output port 146 is coupled to the second processing module 142; and the audio input/output port 147 is coupled to the second processing module 142.

In this embodiment, the first, second and third pairs of differential signals are transmitted by the first, second and third pairs of differential transmission lines 101, 102 and 103, respectively, to the first amplifier 141, processed by the first amplifier 141 and sent to the first processing module 140. The first processing module 140 extracts the first, second and third pairs of video differential signals R+/R−, G+/G− and B+/B− from the amplified first, second and third pairs of differential signals.

The second processing module 142 extracts the pair of horizontal sync differential signals H+/H−, the pair of vertical sync differential signals V+/V−, audio signals A and data signals D from two or three pairs among the first, second and third pairs of differential signals.

The sync detection module 144 receives, from the video input port 148, the remote-captured video signal that has been captured by the remote capture device 18, and detects blanking periods of the remote video signal. When a blanking period is detected, the sync detection module 144 outputs a detection signal to the second processing module 142. Based on the sync detection signal received from the sync detection module 144, the second processing module 142 outputs the remote audio and remote data signals to the second amplifier 143 during the blanking period, so that the remote audio and remote data signals are loaded by the second amplifier 143 onto the remote video signal during the blanking period, to generate processed remote-captured video and/or audio signals. The processed remote-captured video and/or audio signals are outputted by the second amplifier 143 to the fourth pair of differential transmission lines 104. In other words, the receiving device 14 utilizes the blanking periods of the remote video signal to transmit remote audio signals and remote data signals over the fourth pair of differential transmission lines 104.

The video output port 145 outputs RGB video signal and sync signal based on the first, second and third pairs of video differential signals R+/R−, G+/G− and B+/B− from the first processing module 140 and the pairs of horizontal and vertical sync differential signals H+/H− and V+/V− from the second processing module 142. The data input/output port 146 receives and outputs data signals D in a bi-directional transmission. The audio input/output port 147 transmits audio signals A in a bi-directional transmission; one direction may be for the speaker signal to the digital signage device 16, and the other direction may be for the microphone signals captured by the video and audio capture device 18. The video and audio input port 148 receives remote-captured video and/or audio signals (in this case, it includes only video signals) and sends them to the amplifier 143 for amplification and transmission.

In various implementations, the video output port 145 may use a VGA format or other format video output port; the data input/output port 146 may use an asynchronous transmission standard interface RS-232 or other format data input/output port; the audio input/output port 147 may use any suitable format audio input/output port; and the video and audio input port 148 may use an RCA format connector; but they are not limited thereto.

Figure 3A:
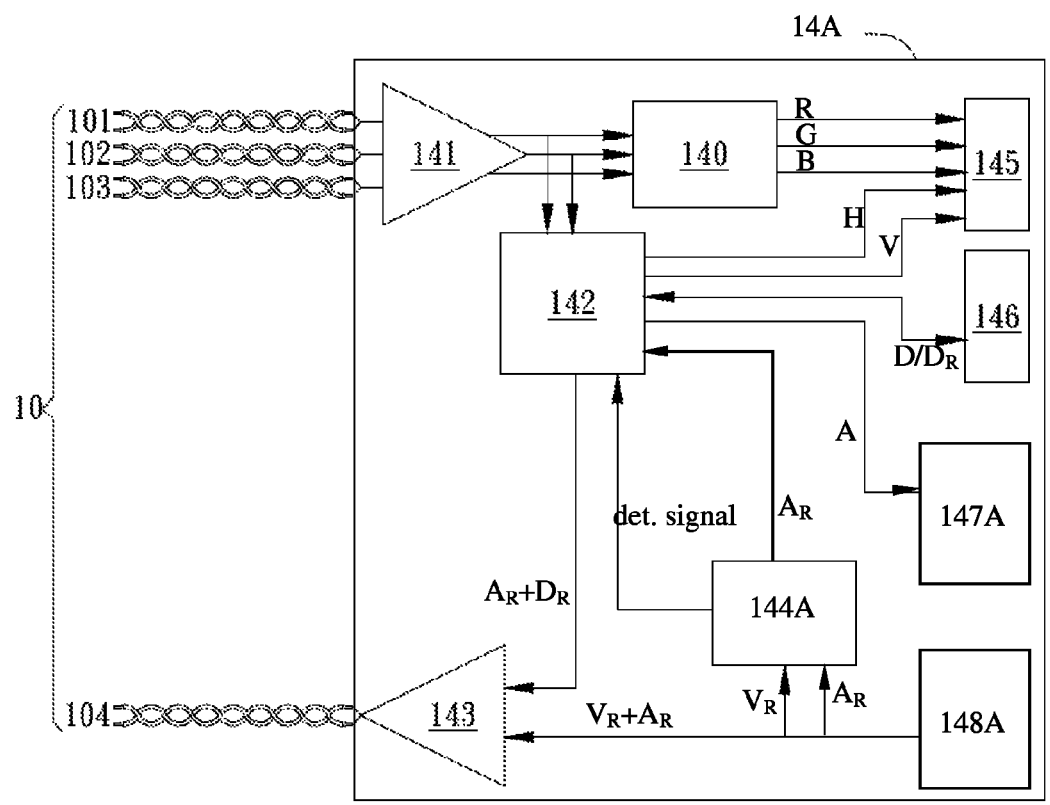
FIG. 3A illustrates an alternative receiving device of the digital signage system.

FIG. 3A illustrates an alternative implementation of the receiving device of FIG. 3. The receiving device 14A shown in FIG. 3A has the same structure as the receiving device 14 of FIG. 3, with the following exceptions: The port 147A is an audio output port only (no input); the port 148A is a video and audio input port that receives both the video signal and audio (microphone) signal captured by the remote capture device 18; the component 144A, in addition to performing the sync detection function of the sync detection module 144 of FIG. 3, also receives the audio signals from the video and audio input port 148A and sends it to the second processing module 142. In other words, the main difference between the receiving devices 14 and 14A is the port through which the audio signal form the remote capture device 18 is inputted to the receiving device.

Figure 4:
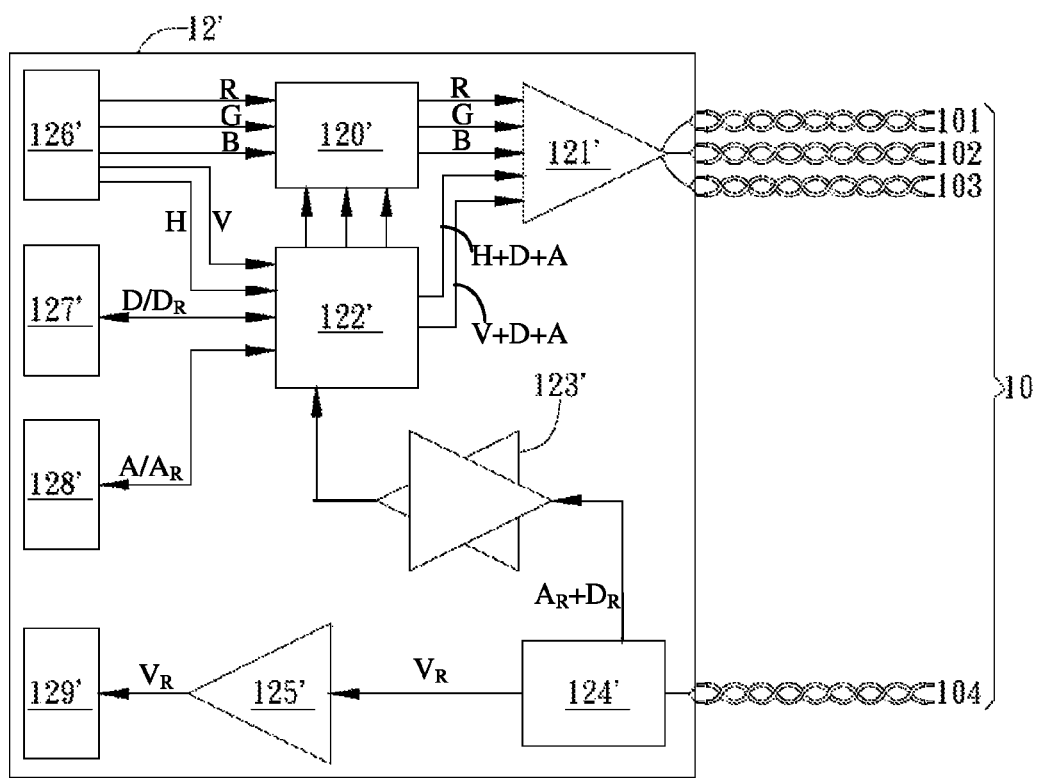
FIG. 4 illustrates another example of a transmitting device of the digital signage system.
Figure 5:
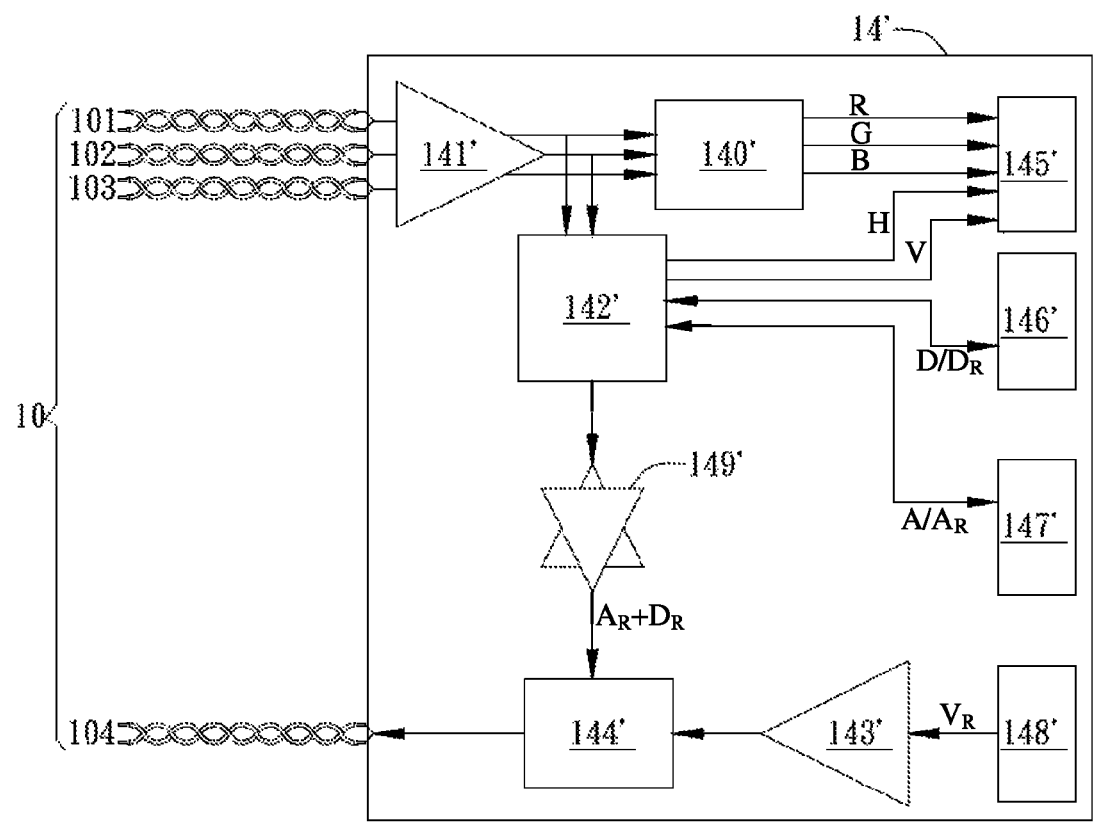
FIG. 5 illustrates another example of a receiving device of the digital signage system.

It is noted that the embodiment shown in FIGS. 2 and 3/3A are suitable for transmitting and receiving composite interface format remote-captured video and/or audio signals. In other embodiments, the transmitting and receiving devices are not limited to this type of format. FIGS. 4 and 5 illustrate a transmitting device and a receiving device according to another embodiment of the present invention. This embodiment is suitable when the remote-captured video and/or audio signals are serial digital interface (SDI) video and/or audio signals.

As shown in FIG. 4, the transmitting device 12' of the digital signage system includes a first processing module 120', a second processing module 122', a fourth processing module 124', a first amplifying and signal composing circuit 121', a third amplifier 123', a fourth amplifier 125', a video input port 126', a data input/output port 127', an audio input/output port 128', and a video output port 129'. The video input port 126' is coupled to the first processing module 120' and the second processing module 122'; the data input/output port 127' is coupled to the second processing module 122'; the audio input/output port 128' is coupled to the second processing module 122'; and the video output port 129' is coupled to the fourth amplifier 125'. The first amplifying and signal composing circuit 121' is coupled between the first processing module 120' and the second processing module 122' on the one side and the first, second and third pairs of differential transmission lines 101, 102 and 103 on the other. The third amplifier 123' is coupled between the second processing module 122' and the fourth processing module 124'. The fourth processing module 124 is coupled between the fourth amplifier 125' and the fourth pair of differential lines 104.

In this embodiment, the at least one video and/or audio signal includes video signal RGB, a pair of horizontal sync differential signals H+/H−, a pair of vertical sync differential signals V+/V−, audio signals A and data signals D, but are not limited thereto. The RGB video signals, the pair of horizontal sync differential signals H+/H− and the pair of vertical sync differential signals V+/V− are inputted from the video input port 126'; the data signals D are transmitted bi-directionally via the data input/output port 127'; and the audio signals A are transmitted bi-directionally via the audio input/output port 128'. More specifically, the video input port 126' transmits the first, second and third pairs of video differential signals R+/R−, G+/G− and B+/B− of the RGB video signals to the first processing module 120', and transmits the pair of horizontal sync differential signals H+/H− and the pair of vertical sync differential signals V+/V− to the second processing module 122'. In various implementations, the video input port 126' may use a VGA format or other format video input port; the data input/output port 127' may use an asynchronous transmission standard interface RS-232 or other format data input/output port; and the audio input/output port 128' may use any suitable format audio input/output port.

When the first processing module 120' receives the first, second and third pairs of video differential signals R+/R−, G+/G− and B+/B− of the RGB video signals, it switches the RGB signal to one of the multiple first amplifying and signal composing circuit 121' for transmission to one of the receiving devices 14'. The first processing module 120 may be an analog switch but is not limited thereto. It should be noted that although only one first amplifying and signal composing circuit 121' is shown in FIG. 4, the transmitting device 12' may have multiple first amplifying and signal composing circuits 121' corresponding to multiple sets of lines 10 and multiple receiving devices 14').

The second processing module 122' transforms the audio signals A and data signals D into a pair of differential audio signals A+/A− and a pair of differential data signals D+/D−, respectively. The second processing module 122' also has a switching function to switch to one of the multiple first amplifying and signal composing circuits 121'. The first processing module 120', the second processing module 122' and the first amplifying and signal composing circuit 121' collectively perform the function of composing the pair of horizontal sync differential signals H+/H− and the pair of vertical sync differential signals V+/V− with any two of the first, second and third pairs of video differential signals R+/R−, G+/G− and B+/B−, to generate two pairs of composite differential signals, such as a first pair of composite differential signals H+R+/H-R− and the second pair of composite differential signals V+G+/V-G−, and loading the differential audio signals A+/A− and differential data signals D+/D− onto two of the three pairs of video differential signals H+R+/H-R−, V+G+/V-G− and B+/B−. Similar to the embodiment of FIG. 2, the audio and data signals are loaded onto the differential signals H+R+/H-R−, V+G+/V— G− and B+/B− during the blanking periods of the video signal. The first, second and third pairs of differential video signals loaded with the differential data and audio signals are amplified by the first amplifying and signal composing circuit 121' and outputted to the first, second and third pairs of differential transmission lines 101, 102 and 103, respectively. In various implementations, the second processing module 122' may be a data/sync receiver, but is not limited thereto.

The fourth processing module 124' receives processed remote-captured video and/or audio signals from the fourth pair of differential transmission lines 104, and separates the various types of signals contained therein, including remote video signals, remote audio signals and remote data signals. As will be described later, the remote audio and remote data signals have been loaded into the blanking periods of the remote video signals by the receiving device 14'.

The fourth processing module 124' transmits the remote audio and remote data signals to the third amplifier 123' for amplification and then to the second processing module 122'. The fourth processing module 124' also transmits the remote video signal to the fourth amplifier 125' for amplification and then outputted via the video output port 129'. The third amplifier 123' coupled between the second processing module 122' and fourth processing module 124' amplifies the remote audio signal and remote data signal. In implementations of this embodiment, the fourth processing module 124' may be a duplex filter, and the video output port 129' may use a BNC format connector, but they are not limited thereto.

The structure of the receiving device 14' is described next with reference to FIG. 5. The receiving device 14' includes a first processing module 140', a first amplifier 141', a second processing module 142', a second amplifier 143', a signal coupler 144', a video output port 145', a data input/output port 146', an audio input/output port 147', a video input port 148', and a uni-directional amplifier 149'. The first amplifier 141' is coupled to the first, second, and third pairs of differential transmission lines 101, 102, and 103 on the one side and to the first processing module 140' on the other. The second processing module 142' is coupled to a point between the first processing module 140' and the first amplifier 141' and coupled to the uni-directional amplifier 149'. The uni-directional amplifier 149' is coupled between the second processing module 142' and signal coupler 144'. The second amplifier 143' is coupled between the signal coupler 144' and the video input port 148'. The signal coupler 144' is coupled to the fourth pair of differential transmission lines 104. The video output port 145' is coupled to the first processing module 140' and the second processing module 142'; the data input/output port 146' is coupled to the second processing module 142'; and the audio input/output port 147' is coupled to the second processing module 142'.

In this embodiment, the first, second and third pairs of differential signals are transmitted by the first, second and third pairs of differential transmission lines 101, 102 and 103, respectively, to the first amplifier 141', processed by the first amplifier 141', and sent to the first processing module 140'. The first processing module 140' extracts the first, second and third pairs of video differential signals R+/R−, G+/G− and B+/B− from the amplified first, second and third pairs of differential signals.

The second processing module 142' extracts the pair of horizontal sync differential signals H+/H−, the pair of vertical sync differential signals V+/V−, audio signals A and data signals D from two or three pairs among the first, second and third pairs of differential signals.

The signal coupler 144' loads the remote audio signals and remote data signals (received via ports 146' and 147' and the second processing module 142') to the remote-captured video and/or audio signal to generate processed remote-captured video and/or audio signals, and outputs the signals to the fourth pair of differential transmission lines 104. The bi-directional amplifier 149' coupled between the signal coupler 144' and the second processing module 142' amplifies the remote audio signal and remote data signal. In implementations of this embodiment, the signal coupler 144' may be a duplex filter, but is not limited thereto.

The video output port 145' outputs RGB video signal and sync signal based on the first, second and third pairs of video differential signals R+/R−, G+/G− and B+/B− from the first processing module 140' and the pairs of horizontal and vertical sync differential signals H+/H− and V+/V− from the second processing module 142'. The data input/output port 146' receives and outputs data signals D in a bi-directional transmission. The audio input/output port 147' transmits audio signals A in a bi-directional transmission; one direction may be for the speaker signal to the digital signage device 16, and the other direction may be for the microphone signals captured by the video and audio capture device 18. The video input port 148' receives remote-captured video signal and sends them to the second amplifier 143', which amplifies the signals and sends them to the signal coupler 144'.

In various implementations, the video output port 145' may use a VGA format or other format video output port; the data input/output port 146' may use an asynchronous transmission standard interface RS-232 or other format data input/output port; the audio input/output port 147' may use any suitable format audio input/output port; and the video input port 148' may use a BNC format connector; but they are not limited thereto.

Compared to conventional technologies, the digital signage system according to embodiments of the present invention only requires one Cat. 5 differential transmission cable to accomplish bi-directional video and audio data transmission for each signage device. Therefore, regardless of whether a particular signage device in the system uses uni-directional or bi-directional video and audio transmission, the entire system would not need to be re-built and no additional transmission lines would be needed if some of the signage devices are upgraded to bi-directional transmission. This greatly reduces the complexity and cost of establishing bi-directional video and audio transmission networks and effectively reduces the construction time and cost of digital signage systems. Further, the digital signage system according to embodiments of the present invention not only can transmit video and audio contents to the digital signage devices for display, but also can capture video and audio signals by the remotely located video and audio capture device and transmit the signals back to the control stations. This allows statistical analyses about the viewers, so that advertisers can use such statistical data to target their content based on demographics and other characteristics of the viewers as well as time, location and other conditions.

It will be apparent to those skilled in the art that various modification and variations can be made in the digital signage system and related methods of the present invention without departing from the spirit or scope of the invention. Thus, it is intended that the present invention cover modifications and variations that come within the scope of the appended claims and their equivalents.

What is claimed is:

1. A digital signage system, comprising:
   a transmitting device adapted for coupling to one end of a cable, the cable including a first, a second, a third and a fourth pair of differential transmission lines, the transmitting device receiving a video signal, transforming the video signal to a first, a second, and a third pair of differential signals, and transmitting the first, second, and third pair of differential signals to the first, second, and third pair of differential transmission lines, respectively; and
   a receiving device adapted for coupling to another end of the cable, for receiving the first, second, and third pair of differential signals from the first, second, and third pair of differential transmission lines of the cable, and transforming the first, second, and third pair of differential signals to the video signal,
   wherein the receiving device receives a remote-captured video signal, generates a processed remote-captured video signal which contains the remote-captured video signal, and transmits the processed remote-captured video signal to the transmitting device via the fourth pair of differential transmission lines of the cable.

2. The digital signage system of claim 1, further comprising:
   at least one digital signage device each coupled to one of the at least one receiving device, for receiving the at least one video signal from the receiving device and displaying it.

3. The digital signage system of claim 2, further comprising:
   at least one video capture device each coupled to one of the at least one receiving device, for capturing the remote-captured video signal and transmitting it to the receiving device.

4. The digital signage system of claim 3, wherein the at least one video capture device is installed in a vicinity of or built into the respective digital signage device.

5. The digital signage system of claim 3, wherein the remote-captured video signal is a composite interface format video signal or a Serial Digital Interface (SDI) format video signal.

6. The digital signage system of claim 1, further comprising:
   a video signal generating device coupled to the transmitting device, for receiving a first control signal, generating the at least one video signal based on the first control signal, and transmitting the at least one video signal to the transmitting device.

7. The digital signage system of claim 6, further comprising:
   a control device coupled to the video signal generating device, for receiving the first control signal via a network and transmitting the first control signal to the video signal generating device.

8. The digital signage system of claim 1, wherein the transmitting device further receives a pair of horizontal sync differential signals, a pair of vertical sync differential signals, an audio signal and a data signal, wherein the at least one video signal includes a first, a second and a third pair of video differential signals, wherein the transmitting device includes:
   a first processing module for switching the first, second and third pairs of video differential signals; and
   a second processing module coupled to the first processing module, for composing the pair of horizontal sync differential signals and the pair of vertical sync differential signals with two pairs among the first, second and third pairs of video differential signals, for transforming the audio signal and the data signal into a pair of differential audio signals and a pair of differential data signals, respectively, and for loading the pair of differential audio signals and the pair of differential data signals onto two pairs among the first, second and third pairs of video differential signals, to generate the first, second and third pairs of differential signals for outputting to the first, second and third pairs of differential transmission lines, respectively.

9. The digital signage system of claim 8,
   wherein each receiving device further receives a remote-captured audio signal, generating a processed remote-captured audio signal which contains the remote-captured audio signal, and transmitting the processed remote-captured audio signal to the transmitting device via the fourth pair of differential transmission lines of the coupled cable, and
   wherein the transmitting device further comprises:
   a third processing module coupled to the second processing module and the fourth pair of differential transmission lines, for receiving the processed remote-captured video and the processed remote-captured audio signal from the fourth pair of differential transmission lines, extracting the remote-captured video signal contained therein, and transmitting the remote-captured audio signal to the second processing module.

10. The digital signage system of claim 9, wherein the transmitting device further comprises:
a first amplifier coupled between the second processing module and the third processing module for uni-directional transmission of the remote-captured audio signal.

11. The digital signage system of claim 8, wherein the second processing module loads the pair of differential audio signals and the pair of differential data signals into blanking periods of the two pairs among the first, second and third pairs of differential signals.

12. The digital signage system of claim 1, further comprising:
a local station receiver coupled to the transmitting device for receiving a second control signal, generating the at least one video signal based on the second control signal, and transmitting the at least one video signal to the transmitting device.

13. The digital signage system of claim 8,
wherein the remote-captured video signal is a composite interface format video signal, wherein each receiving device further receives a remote-captured audio signal, and wherein the receiving device further comprises:
a first processing module receiving the first, second and third pairs of differential signals via the first, second and third pairs of differential transmission lines and extracting the first, second and third pairs of video differential signals;
a second processing module coupled to the first processing module and the fourth pair of differential transmission lines, for extracting the pair of horizontal sync differential signals, the pair of vertical sync differential signals, the audio signal and the data signal from the first, second and/or third pairs of differential signals; and
a sync detection module coupled to the second processing module, for receiving the remote-captured video signal, detecting blanking periods of the remote-captured video signal, and outputting a detection signal to the second processing module when a blanking period is detected,
wherein based on the detection signal, the second processing module loads the remote-captured audio signal onto the remote-captured video signal during the blanking period, to generate the processed remote-captured video signal for outputting to the fourth pair of differential transmission lines of the coupled cable.

14. The digital signage system of claim 8, wherein the remote-captured video signal is a Serial Digital Interface (SDI) format video signal, wherein each receiving device further receives a remote-captured audio signal, and wherein the receiving device further comprises:
a first processing module receiving the first, second and third pairs of differential signals via the first, second and third pairs of differential transmission lines and extracting the first, second and third pairs of video differential signals;
a second processing module coupled to the first processing module, for extracting the pair of horizontal sync differential signals, the pair of vertical sync differential signals, the audio signal and the data signal from the first, second and/or third pairs of differential signals; and
a signal coupler coupled to the second processing module and the fourth pair of differential transmission lines, for loading the remote-captured audio signal onto the remote-captured video signal to generate the processed remote-captured video signal for outputting to the fourth pair of differential transmission lines of the coupled cable.

15. The digital signage system of claim 14, wherein the receiving device further comprises:
a uni-directional amplifier coupled between the signal coupler and the second processing module, for uni-directional transmission of the remote-captured audio signal.

16. The digital signage system of claim 8, wherein the transmitting device further comprises:
a video input port coupled to the first processing module and the second processing module, for receiving the video signal including the first, second and third pairs of video differential signals, the pair of horizontal sync differential signals and the pair of vertical sync differential signals, and for transmitting the video signal to the first processing module and transmitting the pair of horizontal sync differential signals and the pair of vertical sync differential signals to the second processing module;
a data input/output port coupled to the second processing module, for bi-directional transmission of the data signal; and
an audio input/output port coupled to the second processing module, for bi-directional transmission of the audio signal.

17. The digital signage system of claim 9, wherein the transmitting device further comprises:
a second amplifier coupled to the third processing module for amplifying the remote-captured video signal; and
a video output port coupled to the third processing module via the second amplifier, for outputting the amplified remote-captured video signal.

18. The digital signage system of claim 13, wherein the receiving device further comprises:
a video output port coupled to the first processing module and the second processing module, for receiving the first, second and third pairs of video differential signals of the video signal from the first processing module and receiving the pair of horizontal sync differential signals and the pair of vertical sync differential signals from the second processing module, and for outputting the video signal, the pair of horizontal sync differential signals and the pair of vertical sync differential signals;
a data input/output port coupled to the second processing module, for bi-directional transmission of the data signal; and
an audio input/output port coupled to the second processing module, for bi-directional transmission of the audio signal.

19. The digital signage system of claim 13, wherein the receiving device further comprises:
an amplifier; and
a video input port coupled to the amplifier, for receiving the remote-captured video signal and transmitting it to the amplifier for amplification.

20. The digital signage system of claim 13, wherein the receiving device further comprises:
a video output port coupled to the first processing module and the second processing module, for receiving the first, second and third pairs of video differential signals of the video signal from the first processing module and receiving the pair of horizontal sync differential signals and the pair of vertical sync differential signals from the second processing module, and for outputting the video signal, the pair of horizontal sync differential signals and the pair of vertical sync differential signals;

a data input/output port coupled to the second processing module, for bi-directional transmission of the data signal; and an audio output port coupled to the second processing module, for outputting the audio signal.

21. The digital signage system of claim 13, wherein the receiving device further comprises:

an amplifier; and a video and audio input port coupled to the amplifier, for receiving the remote-captured video and the remote-captured audio signal, transmitting the remote-captured video signal to the amplifier for amplification, and transmitting the remote-captured audio signal to the second processing module.

22. The digital signage system of claim 14, wherein the receiving device further comprises:

a video output port coupled to the first processing module and the second processing module, for receiving the first, second and third pairs of video differential signals of the video signal from the first processing module and receiving the pair of horizontal sync differential signals and the pair of vertical sync differential signals from the second processing module, and for outputting the video signal, the pair of horizontal sync differential signals and the pair of vertical sync differential signals;

a data input/output port coupled to the second processing module, for bi-directional transmission of the data signal; and an audio input/output port coupled to the second processing module, for bi-directional transmission of the audio signal.

23. The digital signage system of claim 14, wherein the receiving device further comprises:

an amplifier; and a video input port coupled to the amplifier, for receiving the remote-captured video signal and transmitting it to the amplifier for amplification.

24. The digital signage system of claim 1, wherein each receiving device further receives a remote-captured audio signal, generating a processed remote-captured audio signal which contains the remote-captured audio signal, and transmitting the processed remote-captured audio signal to the transmitting device via the fourth pair of differential transmission lines of the coupled cable.

\* \* \* \* \*